US006211491B1

(12) United States Patent
Mazaki

(10) Patent No.: US 6,211,491 B1
(45) Date of Patent: Apr. 3, 2001

(54) ANTI-FOGGING GLASS

(75) Inventor: Naokazu Mazaki, Kanagawa (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/435,609

(22) Filed: Nov. 8, 1999

(30) Foreign Application Priority Data

Oct. 11, 1998 (JP) ........ 10-319197

(51) Int. Cl.[7] ........ B60L 1/02
(52) U.S. Cl. ........ 219/203; 219/541
(58) Field of Search ........ 219/200, 201, 219/202, 203, 538, 539, 541, 522, 211

(56) References Cited

U.S. PATENT DOCUMENTS 3,832,527 * 8/1974 Nagasima ........ 219/522
4,682,007 * 7/1987 Hollander ........ 219/211
5,354,966 * 10/1994 Sperbeck ........ 219/203
5,473,981 12/1995 Mazaki .
5,824,994 10/1998 Noda et al. .

FOREIGN PATENT DOCUMENTS 297 10 851 12/1997 (DE) .
0 524 537 1/1993 (EP) .

* cited by examiner

*Primary Examiner*—Tu Ba Hoang
(74) *Attorney, Agent, or Firm*—Oblon, Spivak, McClelland, Maier & Neustadt, P.C.

(57) ABSTRACT

An anti-fogging glass having a plurality of conductive heating lines, a pair of bus bars to which both ends of the respective heating lines are connected, and terminal portions on the respective bus bars, to which terminals for supplying a current are to be connected, wherein the plurality of heating lines comprise first heating lines and second heating lines in a predetermined proportion to the plurality of heating lines, the second heating lines are connected in the vicinity of at least one terminal portion, and the vicinity of the terminal portion, in which the second heating lines are connected, is a second region other than a first region constituting a current pathway to the first heating line.

10 Claims, 8 Drawing Sheets

ANTI-FOGGING GLASS

BACKGROUND OF THE INVENTION

1. Field of the Invention

The present invention relates to an anti-fogging glass, which is designed to prevent fogging by heating the glass plate by supplying power to a heating unit formed on the surface of the glass plate.

2. Discussion of Background

As a window glass to be mounted in e.g. a rear window frame of an automobile, an anti-fogging glass having an anti-fogging function is commonly employed to secure safe visibility. Such anti-fogging glass is provided on the surface thereof with a heating unit formed by printing a conductive paste such as silver in a suitable pattern on the surface of a glass plate, followed by heating and baking it.

A conventional structure of an anti-fogging glass for an automobile, provided with a heating unit, is shown in FIG. 8. The heating unit comprises a plurality of lines, and has heating lines (heat strips) 71 having a narrow width (from about 0.5 to 1 mm), formed to extend substantially in parallel with one another with a distance of a few tens mm in a longitudinal (transverse) direction of the anti-fogging glass and a pair of symmetric bus bars 73 having a large width formed in the vicinities of the short side edges of the anti-fogging glass in the short side direction (vertical direction) of the anti-fogging glass, to which both ends of these heating lines 71 are connected. Further, at the lower end of each bus bar 73, a terminal 75 for connecting a power supply wire (not shown) connected to a power source of an automobile, to the bus bar 73, is provided and fixed by e.g. solder.

When power supply to the heating lines 71 is carried out with such a conventional anti-fogging glass having the above described construction, a current obtained from the power source of an automobile is supplied to the bus bars 73 via the power supply wires and the terminals 75 and from the bus bars 73 to the respective heating lines 71. The heating lines 71 are thereby heated, so that the glass plate 77 is heated mainly in the anti-fogging region 79.

As described above, the anti-fogging glass is designed to remove or prevent deposition of e.g. moisture, frost or icing on the surface of a glass plate by utilizing heat generated by the heating lines 71, thereby to secure the transparency of the glass.

SUMMARY OF THE INVENTION

With a conventional anti-fogging glass for an automobile, it is common that a terminal 75 for supplying a current is provided at a lower end portion of a bus bar, for example, because of a restriction from the design of the automobile. Further, all heating lines 71 are connected on the upper side of the glass plate than the upper side line of the terminal 75, whereby all currents supplied to the heating lines 71 from the terminal 75 are supplied via a bus bar on the upper side of the glass plate than the upper side 75*a* of the terminal 75. Particularly, at the bus bar portion ranging from the upper side 75*a* of the terminal 75 in FIG. 8 to the connected point of the lowermost heating line connected to the bus bar, all currents supplied from the terminal 75 will flow, whereby the heat generation is substantial, and there has been a problem such as excessive heat generation.

Further, although it depends on the particular application, the temperature for operating the bus bars 73 without adversely affecting the interior material in the vicinity of the bus bars 73 or other constituting elements such as solder for bonding the terminals 75, is at most a predetermined temperature (for example, at most about 75° C., and, more particularly, at most at about 70° C.). Accordingly, if there is a portion exceeding the above predetermined temperature, even if it is only a small part of the bus bars, it has been common to prevent excessive heat generation by 1) broadening the transverse width of the bus bars or 2) reducing the resistance of the bus bars by overcoating a conductive paste on the bus bar surface or by a special printing method such as partial thick printing of the bus bar portions.

However, such a method brings about an increase of the production cost due to the conductive paste or the screen printing plate and cumbersomeness of the production process due to the special printing. Further, in the method 2), bus bar bleeding or bus bar peripheral irregularities are likely to result, such being undesirable.

The present invention has been made in view of the above-mentioned situations, and it is an object of the present invention to provide an anti-fogging glass, particularly an anti-fogging glass suitable for automobiles, which is provided with a pattern of heating elements capable of preventing excessive heat generation at bus bars even if a current of the conventional level is supplied to bus bars having no special printing applied, while reducing the production cost, simplifying the production process and improving the product quality.

The present invention provides an anti-fogging glass (first aspect of the invention) having a plurality of conductive heating lines, a pair of bus bars to which both ends of the respective heating lines are connected, and terminal portions on the respective bus bars, to which terminals for supplying a current are to be connected, wherein the plurality of heating lines comprise first heating lines and second heating lines in a predetermined proportion to the plurality of heating lines, the second heating lines are connected in the vicinity of at least one terminal portion, and said vicinity of the terminal portion, in which the second heating lines are connected, is a second region other than a first region constituting a current pathway to the first heating lines, and wherein the second heating lines are connected apart from one another in the second region.

In the anti-fogging glass of the present invention, it is preferred that the second heating lines are connected in the vicinity of one terminal portion and in the vicinity of the other terminal portion, and the respective vicinities of the terminal portions, in which the second heating lines are in connected, are a second region other than a first region constituting a current pathway to the first heating lines.

In the anti-fogging glass of the present invention, the above-mentioned predetermined proportion is preferably from 10 to 50%.

In the anti-fogging glass of the present invention, the second heating lines in a predetermined proportion to the plurality of heating lines, are connected in the vicinity of at least one terminal portion, and said vicinity of the terminal portion, in which the second heating lines are connected, is a second region other than a first region constituting a current pathway to the first heating lines. Preferably, the second heating lines are connected in the vicinity of the one terminal portion and in the vicinity of the other terminal portion, and the respective vicinities of the terminal portions, in which the second heating lines are connected, is a second region other than a first region constituting a current pathway to the first heating lines. Further, the predetermined proportion is preferably from 10 to 50%.

With this construction, it is possible to avoid excessive flow of a current or a concentration of current in a part of the bus bars and thereby to prevent excessive heat generation at the bus bars.

In the anti-fogging glass of the present invention, the above-mentioned second heating lines are connected apart from one another in the second region.

When a plurality of heating lines are bundled into one line (as shown in FIG. 7), in order to suppress heat generation of the line, broadening of the transverse width or special printing such as thick printing is carried out. If the plurality of heating lines are apart from one another without being bundled into one line, the appearance of the same is good without broadening of the transverse width, and there also occurs no such problem as bleeding of the heating line by the thick printing by screen printing. Further, the thick printing is likely to undergo cracking during heating and bending the glass plate due to e.g. a difference in the heat shrinkage. Especially when the glass plate is thin, the glass plate is likely to break during production due to this cracking. A pattern without thick printing is advantageous also from the above viewpoint. Namely, especially when the glass plate is thin, such a thin glass is usually disadvantageous from the viewpoint of the strength. However, if no thick printing is required, even a thin glass plate will not break during the production, whereby the yield can be improved.

In the anti-fogging glass of the present invention, it is preferred that the contact points of the above-noted plurality of heating lines with the bus bars are apart from one another by at least 5 mm, from the viewpoint of suppressing concentrated heat generation of the heating lines.

In the anti-fogging glass of the present invention, the terminal portions are preferably located at the upper or lower ends of the bus bars.

In the anti-fogging glass of the invention (i.e. in the first embodiment of the invention), it is preferred that each bus bar is of a strip shape, each terminal portion is of a rectangular shape (e.g. 5 mm×20 mm to 10 mm×30 mm) and is located at the upper or lower end of the bus bar, and when each bus bar is divided into two regions along the side of the rectangular terminal portion opposite the side at the end of the bus bar, the second region is the region at the end of the bus bar.

In the anti-fogging glass of the present invention (the first aspect of the invention), it is preferred that each bus bar is of a strip shape with one end thereof being of an U-shape, said one end having an adequate area to have the terminal portion located therein, wherein each terminal portion is of a rectangular shape and is located at said one end being of a L-shape, and when each bus bar is divided into two regions along the side of the rectangular terminal portion opposite to the side at the end of the bus bar, the second region is the region at the end of the bus bar.

In the anti-fogging glass of the present invention (the first aspect of the invention), it is preferred that each bus bar is of a strip shape with its one end being of a U-shape, said one end has an adequate area to have the terminal portion located therein, each terminal portion is of a rectangular shape and is located at said one end being of a U-shape, an extension of the inside line of the turn-around portion of the bus bar does not cross the terminal portion, and when each bus bar is divided into two regions along the side of the rectangular terminal portion opposite to the side at the end of the bus bar, the second region is the region at the end of the bus bar. In the anti-fogging glass of the present invention (the first aspect of the invention), it is preferred that each bus bar is of a strip shape with its one end being of a U-shape, each terminal portion is of a rectangular shape and is located at said one end being of a U-shape, an extension of the inside line of the turn-around portion of the bus bar crosses the terminal portion, and with respect to the rectangular terminal portion to which the second heating lines are connectable in a direction substantially perpendicular to each side of the terminal portion, when each bus bar is divided into two regions along the side of the rectangular terminal portion opposite the side at the end of the bus bar, the second region is the region at the end of the bus bar when the bus bar is divided into two regions along the side of the terminal portion on the peripheral side of the anti-fogging glass among the two sides other than the side at the end of the bus bar and the side opposite thereto, the second region is the region on the center side of the anti-fogging glass.

The present invention also provides an anti-fogging glass (the second aspect of the invention) having a plurality of conductive heating lines disposed with a predetermined distance from one another and extending substantially in a horizontal direction at least at their center portions, a pair of bus bars to which both ends of the respective heating lines are connected, and terminal portions located in the vicinities of the lower ends of the respective bus bars, to which terminals for supplying a current are to be connected, wherein among the plurality of heating lines, lower heating lines corresponding to from 10 to 50%, have center portions extending substantially in a horizontal direction and side line portions on both sides of the center portions, wherein said side line portions are bent downward from the respective center portions, and the forward ends thereof on the bus bar side, are connected apart from one another to the bus bars in the vicinities of the terminal portions.

Among the plurality of heating lines, lower heating lines corresponding to from 10 to 50% are connected to the bus bars in the vicinity of the terminal portions, whereby it is possible to avoid excessive flow of a current or concentration of a current in a part of the bus bars, and it is thereby possible to prevent excessive heat generation at the bus bars.

Now, the practical embodiments of the anti-fogging glass of the present invention will be described with reference to the drawings in the order of the first embodiment, the second embodiment, the third embodiment, the fourth embodiment and the fifth embodiment. In the accompanying drawings:

DESCRIPTION OF THE PREFERRED EMBODIMENTS

The anti-fogging glass of the present invention is to be used for e.g. a rear window of an automobile and is composed of a glass plate having a pattern of heating elements (hereinafter referred to simply as a pattern) formed. The pattern is formed by printing a conductive paste comprising e.g. silver on the surface of a glass plate in a predetermined form which will be described hereinafter and then heating it for baking.

The pattern of the present invention comprises a plurality of lines and have heating lines with a narrow width of a level of at most about 1 mm, disposed to extend in parallel with one another with a distance of a few tens mm (e.g. a distance of from 20 to 40 mm) in the longitudinal direction of the anti-fogging glass (i.e. in the transverse direction as the anti-fogging glass is fitted in a window of an automobile) and a pair of bus bars with a large width disposed to extend in the short side direction (the vertical direction) in the vicinities of the edges of the short sides of the anti-fogging glass so that both ends of the heating lines are connected thereto. At one end of each bus bar, a terminal made of e.g. a metal to supply a current from a power supply wire (not shown) connected to a power source of an automobile to the bus bars, is provided and fixed by e.g. solder. In the present invention, the contour of the contact surface between the terminal and the bus bar, or in a case where a plurality of contact surfaces are present due to the shape of the terminal, the shaped portion formed by a line connecting the respective contours, is referred to as a terminal portion, and the terminal portion is roughly of a rectangular shape. Further, this terminal portion is preferably located at an end of the bus bar on the upper or lower side of the glass plate.

First Embodiment

Figure 1:
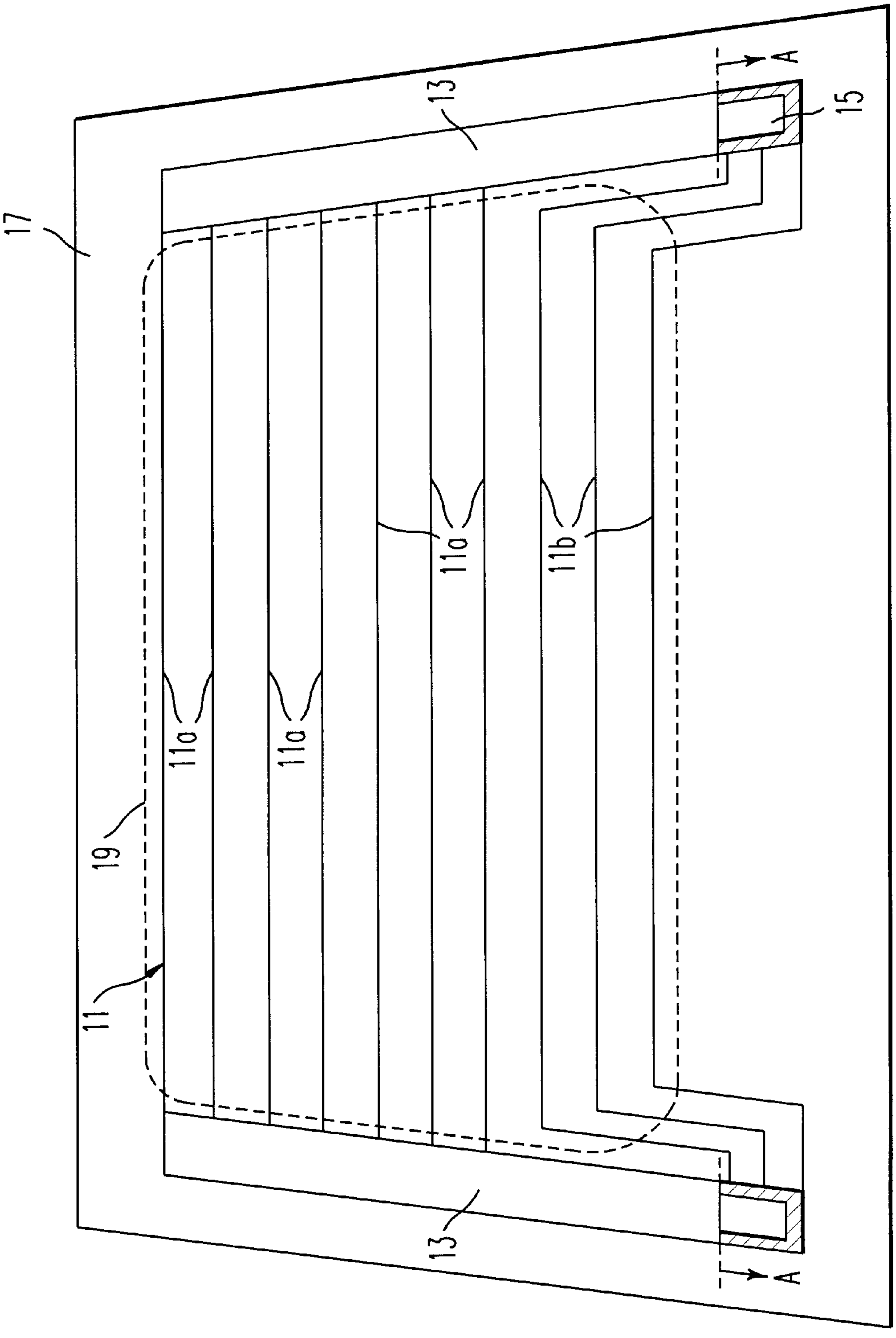
FIG. 1 is a view illustrating an anti-fogging glass provided with a first pattern according to the first embodiment.

Now, a construction of the anti-fogging glass according to the first embodiment of the present invention will be described. FIG. 1 is a view illustrating an anti-fogging glass formed with a first pattern according to the first embodiment of the present invention. As shown in FIG. 1, reference numeral 11 represents heating lines, 11*a* first heating lines, 11*b* second heating lines, 13 bus bars, 15 terminal portions, 17 a glass plate, and 19 an anti-fogging region. In the example shown, ten heating lines 11 are provided, and such are connected to the bus bars 13 so as to not cross one another. Among these ten lines, seven lines on the upper side of the glass plate are substantially linear first heating lines 11*a* without bend, and they are connected to the bus bars 13 in the first region. On the other hand, the three lines on the lower side of the glass plate are second heating lines 11*b*, of which both ends are bent in the vicinities of the bus bars 13 so that they are connected to the bus bars in the vicinities of the terminal portions 15 constituting the second region. In this embodiment, the vicinity of the terminal portion 15 which is a second region in which the second heating lines 11*b* are connected, is a region at the end of the bus bar (i.e. the portion as a second region on the lower side of the upper side line of the terminal portion 15) as shown by the region A in FIG. 1, when the bus bar 13 is divided into two regions along the side of the rectangular terminal portion 15 opposite to the side at the end of the bus bar 15. Namely, the second region corresponds to the region hatched in FIG. 1. The first region is the region of the bus bar 13 not hatched.

In this embodiment, the anti-fogging region 19 on the glass plate 17 by the heating lines 11 is roughly of a trapezoid a1 having an upper side of about 800 mm, a lower side of about 1,000 mm and a vertical length of about 300 mm. The heating lines 11 are lines with a width of from about 0.5 to 1.0 mm, and the respective heating lines are substantially equally apart with a distance of about 30 mm. Each bus bar 13 is of a strip shape with a width of about 12 mm and a length of about 346 mm, and is formed in a length longer than the length of the side of the anti-fogging region 19. Further, each terminal portion 15 is roughly of a rectangular shape with a vertical length of about 21 mm and a transverse length of about 7 mm, and it is located at about 5 mm from the lower end of the bus bar 13.

Further, the adjacent contact points of the respective heating lines 11 with the bus bar 13 are spaced by about 30 mm from the first to the seventh lines on the upper side of the glass plate, respectively, and by about 140 mm between the seventh and eighth lines, and by about 13 mm from the eighth to tenth lines, respectively, in the vicinity of the terminal portion 15.

According to the first embodiment having such a construction, the current to be supplied via a power supply wire from the terminal to the respective heating lines, is supplied to the second heating lines 11*b* from the terminal via a bus bar portion (a second region) on the lower side of the upper side line of the terminal 15. On the other hand, the current is supplied to the first heating lines 11*a* from the terminal via a bus bar portion (a first region i.e. a current pathway to the first heating lines 11*a*) on the upper side of the upper side line of the terminal 15.

Figure 8:
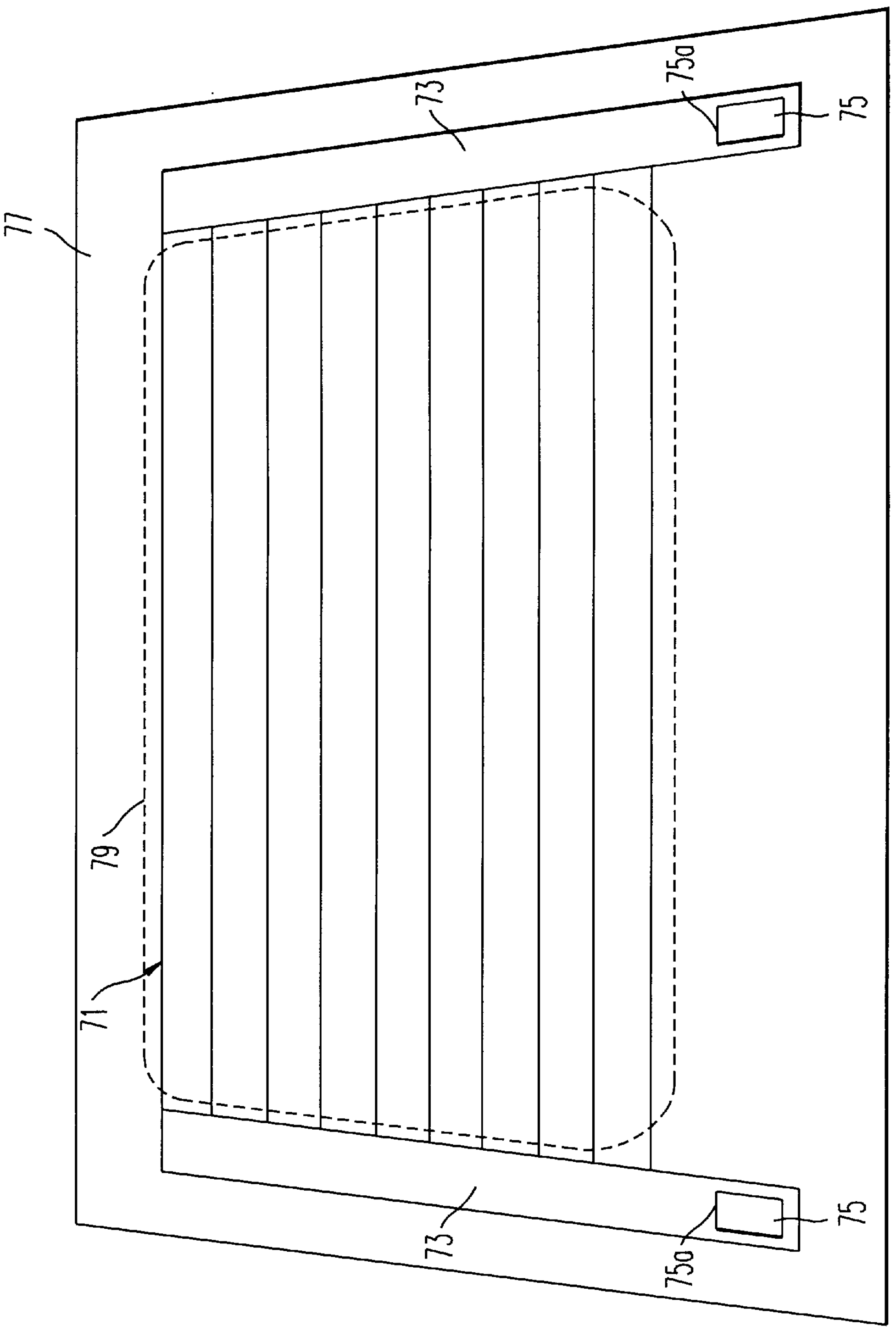
FIG. 8 PRIOR ART
FIG. 8 is a view illustrating a conventional construction of an anti-fogging glass.

Here, as an example, a conventional pattern as shown in FIG. 8 and patterns wherein the shapes of the bus bars are the same as in the first pattern and the number of heating lines connected to the portion (the second region) on the lower side of the upper side line of each terminal portion, varies, were formed, and the heat generation temperatures of the respective bus bars were measured, and the results are shown in Table 1. Table 1 shows the relation between the number of heating lines connected to the portion (the second region) on the lower side of the upper side line of each terminal (in a distance of 10 mm in the case of a plurality of lines) and the heat generation temperature of the bus bar on the upper side of the upper side line of the terminal, when an electric power of 100 W was applied between the terminals for 20 minutes by using a line width of heating lines of from about 0.5 to 1.0 mm (about 0.5 mm at the center portion, and about 1.0 mm in the vicinity of the contact point with the bus bar) and a pattern resistance of 1.44 Ω as the designed values of the pattern. For the temperature measurement, a thermocouple type contact thermometer was used.

TABLE 1

| Number of heating lines connected to the portion on the lower side of the upper side line of each terminal portion | Heat generation temperature of the bus bar on the upper side of the upper side line of each terminal portion |
|---|---|
| 3 lines | 52° C. |
| 2 lines | 61° C. |
| 1 line | 70° C. |
| 0 line | 108° C. |

According to Table 1, as the number of heating lines increases, the heat generation temperature of the bus bar becomes low. Accordingly, when the upper limit temperature for heat generation of the bus bar so that the bus bar operates without adversely affecting other constituting elements, is, for example, 70° C., it is necessary to connect at least one heating line at the bus bar portion on the lower side of the upper side line of the terminal, as is apparent from Table 1. Accordingly, for the anti-fogging glass of the present invention, it is preferred to form a pattern such that both ends of at least 10% of heating lines (for example, two or three heating lines) among the total number of heating lines are connected to the bus bars in the vicinities of the terminal portions. Here, at most 50% is particularly preferred.

Now, Table 2 shows a relation between the distance of the adjacent contact points of the heating lines 11 with the bus bars 13 and the temperature of the heating lines in the vicinity on the contact points, in the first pattern, under the conditions of the designed values and the power consumption employed in Table 1, in the case of three lines in Table 1.

TABLE 2

| Distance of contact points of heating lines with bus bars | Temperature of heating lines in the vicinity of the contact points |
|---|---|
| 4 mm | 71° C. |
| 5 mm | 63° C. |
| 6 mm | 59° C. |

When the contact points are close to one another, the temperature in the vicinity of the contact points rises due to concentrated heat generation of the heating lines. Accordingly, when the upper limit temperature for heat generation of the heating lines 11 is 70° C., it is preferred to secure the distance of the contact points of the heating lines 11 with the bus bar 13 to be at least about 5 mm.

Figure 2:
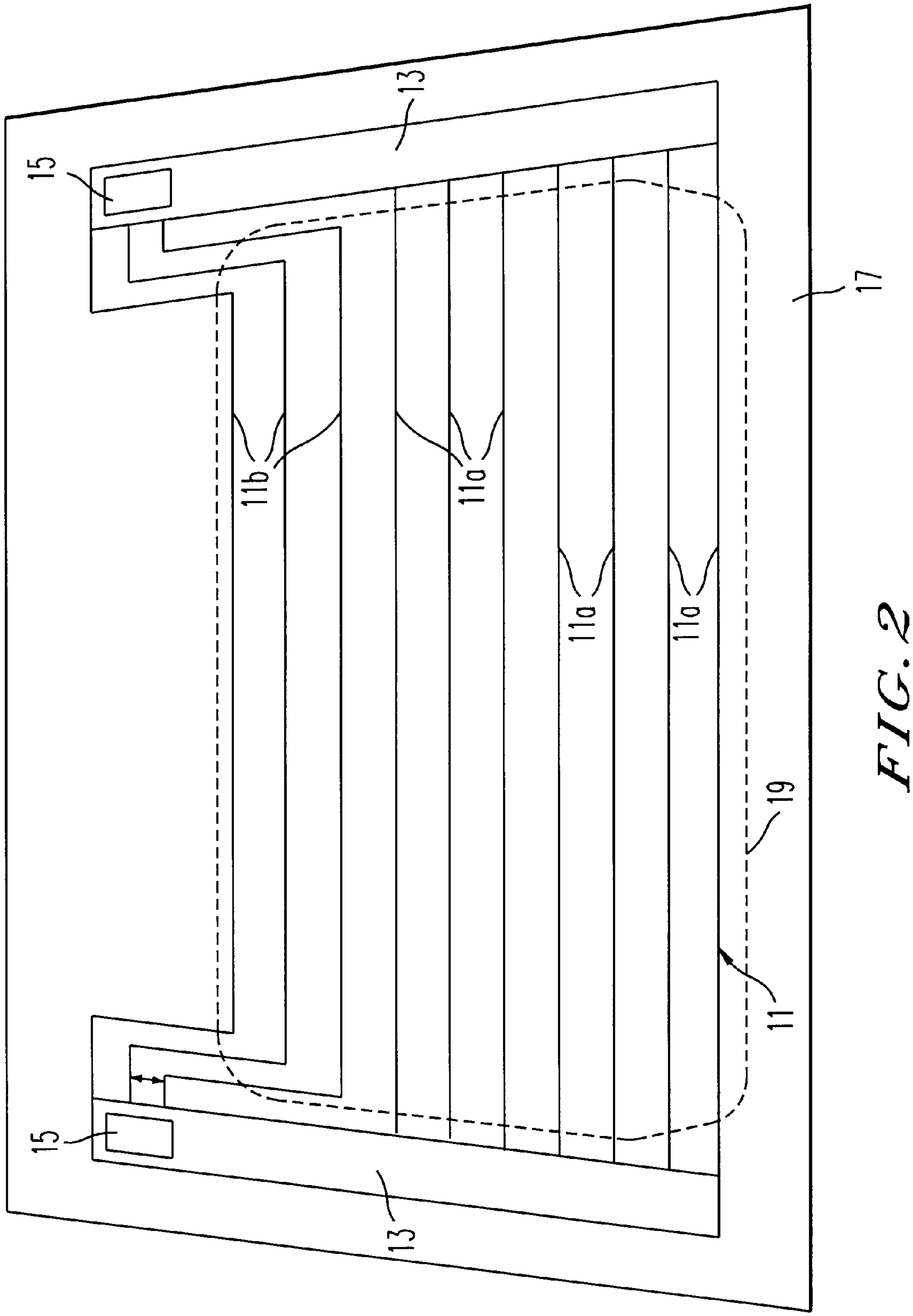
FIG. 2 is a view illustrating a pattern, which is upside down view of the pattern of the first embodiment.

In this embodiment, the terminal portion 15 is located at the end of the bus bar on the lower side of the glass plate. However, as shown in FIG. 2, the terminal portion 15 may be located at the end of the bus bar on the upper side of the glass plate, so that the pattern will be upside down of the first embodiment. Further, the bus bars may be curved, and such a curved pattern is included as one type of the first pattern.

Second Embodiment

Figure 3:
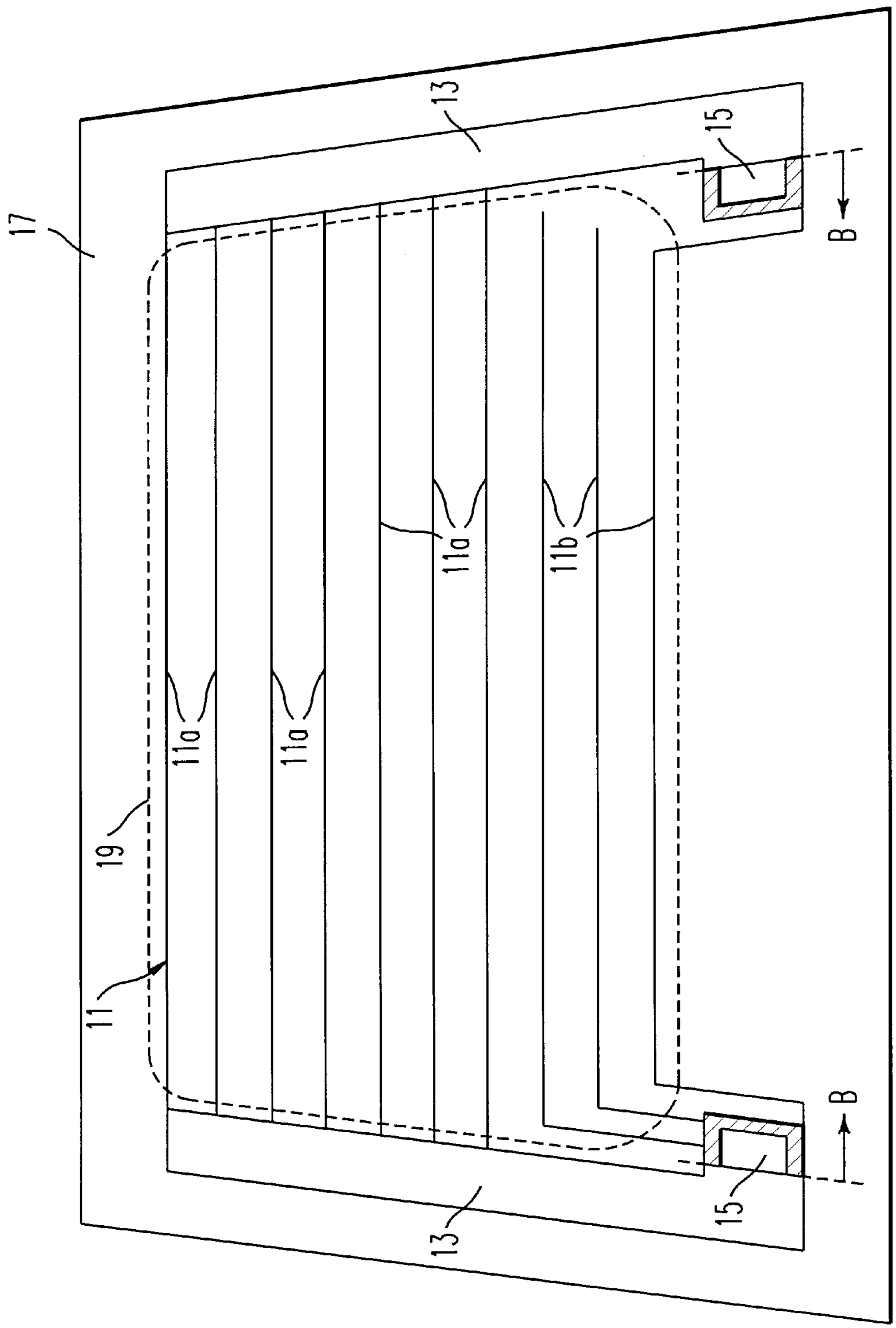
FIG. 3 is a view illustrating an anti-fogging glass provided with a second pattern according to the second embodiment.

FIG. 3 is a view illustrating an anti-fogging glass having a second pattern formed as the second embodiment of the present invention. In FIG. 3, the same parts as in the first embodiment (FIG. 1) are identified with the same symbols or reference numbers, and reference numeral 11 represents heating lines, 11*a* first heating lines, 11*b* second heating lines, 13 bus bars, 15 terminal portions, 17 a glass plate, and 19 an anti-fogging region.

As compared with the first embodiment, the second pattern differs in e.g. the shape of the bus bars 13 and the positions at which the second heating lines 11*b* are connected to the bus bars 13. As shown in FIG. 3, the lower ends of the bus bars 13 are roughly of a L-shape, and they are disposed symmetrically with the bent ends directed inwardly. The terminal portions 15 are located at the L-shape ends (the bent ends) of the bus bars 13.

Like the first embodiment, the second pattern of this embodiment comprises ten heating lines 11, of which 7 lines on the upper side of the glass plate are linear first heating lines 11a without bend, and three lines on the lower side of the glass plate are second heating lines 11*b* bent in the vicinity of the bus bars 13, so that both ends of the second heating lines are connected to the bus bars 13 in the vicinities of the terminal portions 15. However, in this embodiment, the vicinity of the terminal portion 15 which is a second region in which the second heating lines 11*b* are connected, is, as shown by the region B in FIG. 3, the region at the end of the bus bar (i.e. the portion on the lefthand side of the right side line of the terminal portion 15 in the case where the second heating lines 11*b* are connected to the righthand side bus bar, and the portion on the righthand side of the left side line of the terminal portion 15 in the case where the second heating lines 11*b* are connected to the lefthand side bus bar) when the bus bar 13 is divided into two regions along the side of the rectangular terminal portion 15 opposite to the side at the end of the bus bar. Namely, it is the region hatched in FIG. 3. The first region is the region of the bus bar 13, which is not hatched.

Third Embodiment

Figure 4:
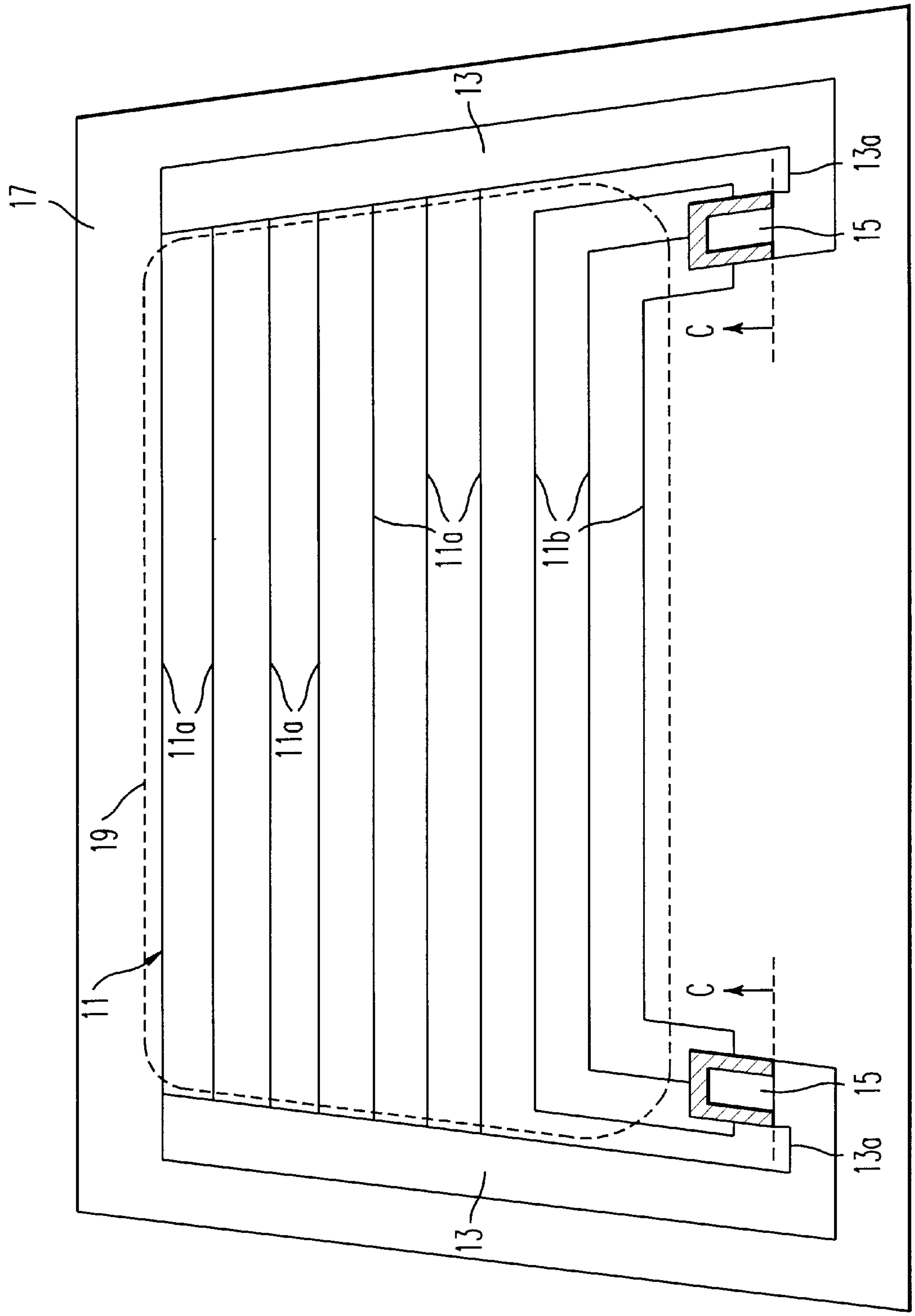
FIG. 4 is a view illustrating an anti-fogging glass provided with a third pattern according to the third embodiment.

FIG. 4 is a view illustrating an anti-fogging glass having a third pattern formed as the third embodiment of the present invention. In FIG. 4, the same parts as shown in the first embodiment (FIG. 1) are identified with the same symbols, and reference numbers 11 represents heating lines, 11*a* first heating lines, 11*b* second heating lines, 13 bus bars, 15 terminal portions, 17 a glass plate, and 19 an anti-fogging region.

As compared with the first embodiment, the third pattern differs in the shape of the bus bars 13 and the positions at which the second heating lines 11*b* are connected to the bus bars 13. As shown in FIG. 4, the bus bars 13 have lower ends being substantially of a turn-around U-shape, and they are disposed symmetrically with the bent ends directed inwardly. The end portion disposed to extend in a vertical direction i.e. the end portion of the U-shape, has an adequate length and area to have the terminal portion 15 located therein, and the terminal portion 15 is located at this end of the U-shape. Namely, in this pattern, as shown in FIG. 4, an extension of the inside line 13*a* of the turn-around portion of the bus bar of U-shape does not cross the terminal portion 15.

Like the first embodiment, the third pattern of this embodiment comprises ten heating lines 11, of which seven lines on the upper side of the glass plate are linear first heating lines 11*a* without bend and are connected to the bus bars 13. On the other hand, three lines on the lower side of the glass plate are second heating lines 11*b* bent in the vicinities of the bus bars 13 so that both ends are connected to the bus bars in the vicinities of the terminal portions 15. However, in this embodiment, the vicinity of the terminal portion 15 which is a second region in which the second heating lines 11*b* are connected, is, as shown by the region C in FIG. 4, the region at the end of the bus bar (i.e. the portion on the upper side of the lower side line of the terminal portion 15) when the bus bar 13 is divided into two regions along the side of the rectangular terminal portion 15 opposite to the side at the end of the bus bar, and it corresponds to the area hatched in FIG. 4. The first region is a region of the bus bar 13, which is not hatched.

Fourth Embodiment

Figure 5:
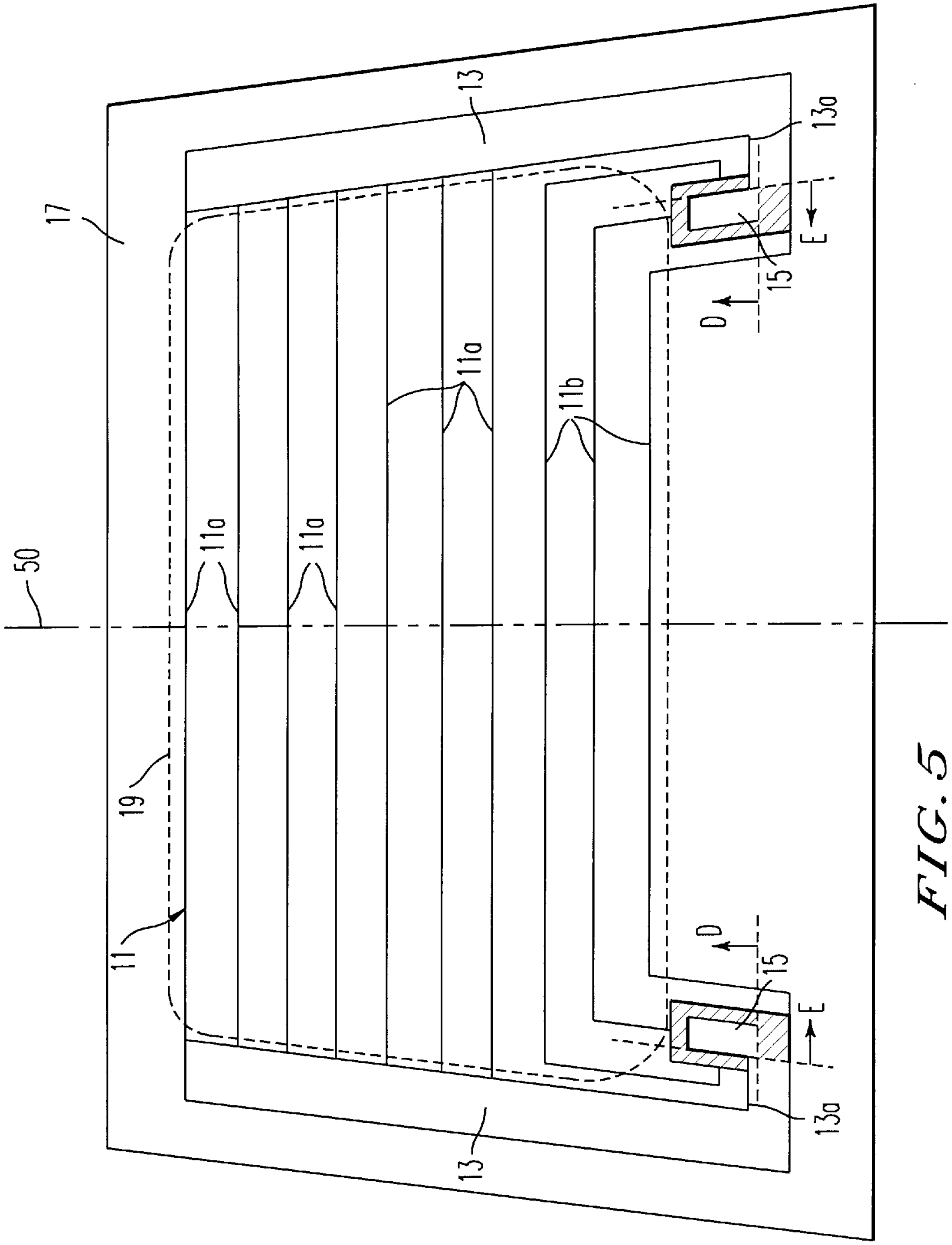
FIG. 5 is a view illustrating an anti-fogging glass provided with a fourth pattern according to the fourth embodiment.

FIG. 5 is a view illustrating an anti-fogging glass having a fourth pattern formed as the fourth embedment of the present invention. In FIG. 5, the same parts as in the first embodiment (FIG. 1) are identified with the same symbols, and reference numeral 11 represents heating lines, 11*a* first heating lines, 11*b* second heating lines, 13 bus bars, 15 terminal portions, 17 a glass plate and 19 an anti-fogging region.

As compared with the first embodiment, the fourth pattern differs in terms the shape of the bus bars 13 and the positions at which the second heating lines 11*b* are connected to the bus bars 13. As shown in FIG. 5, the bus bars 13 have lower ends being roughly of a turned around U-shape, and they are symmetrically disposed with the bent ends directed inwardly. The end portion of U- shape does not have an adequate length and area to have a terminal portion 15 located therein. The terminal portion 15 is located at the end portion and an extension portion of this U-shape (the end portion and the extension portion in a transverse direction). Namely, in this pattern, an extension of the inside line 13_a_ of the turn-around portion of the bus bar of U-shape crosses the terminal portion 15.

Like the first embodiment, the fourth pattern of this embodiment comprises ten heating lines 11, of which seven lines on the upper side of the glass plate are linear first heating lines 11_a_ without bend and connected to the bus bars 13. On the other hand, three lines on the lower side of the glass plate are second heating lines 11_b_ bent in the vicinities of the bus bars 13 so that both ends are connected to the bus bars 13 in the vicinities of the terminal portions 15. However, in this embodiment, the vicinity of the terminal portion 15 which is a second region in which the second heating lines 11_b_ are connected, is, 1) as shown by the region D in FIG. the region at the end of the bus bar (i.e. the portion on the upper side of the lower side line of the terminal portion 15) when the bus bar is divided into two regions along the side of the rectangular terminal portion 15 opposite to the side at the end of the bus bar 13, with respect to the rectangular terminal portion 15 to which the second heating lines 11_b_ are connectable in a direction substantially perpendicular to each side of the terminal portion 15, or 2), as shown by the region E in FIG. 5, the region on the center side of the anti-fogging glass (i.e. the portion on the lefthand side of the right side of the terminal portion 15 in the case where the second heating lines 11_b_ are connected to the righthand side bus bar, and the portion on the righthand side of the left side of the terminal portion 15 in the case where the second heating lines 11_b_ are connected to the lefthand side bus bar), when the bus bar 13 is divided into two regions along the side of the terminal portion 15 on the peripheral side of the anti-fogging glass among the two sides other than the side at the end of the bus bar 13 and the side opposite thereto (here, the peripheral side means the side opposite to the center (the center line 50 of the glass plate) side of the glass plate and corresponds to the side edge side of the glass plate in FIG. 5). Namely, the vicinity of the terminal portion 15 corresponds to the region hatched in FIG. 5. The first region is the region of the bus bar 13, which is not hatched.

In the foregoing embodiments, ten heating lines 11 were formed, but the number of heating lines may be more or less than ten lines. In such a case, it is preferred that from 10 to 50% of heating lines are connected to the bus bars in the vicinities of the terminal portions 15, as the second heating lines 11_b_.

Fifth Embodiment

Figure 6:
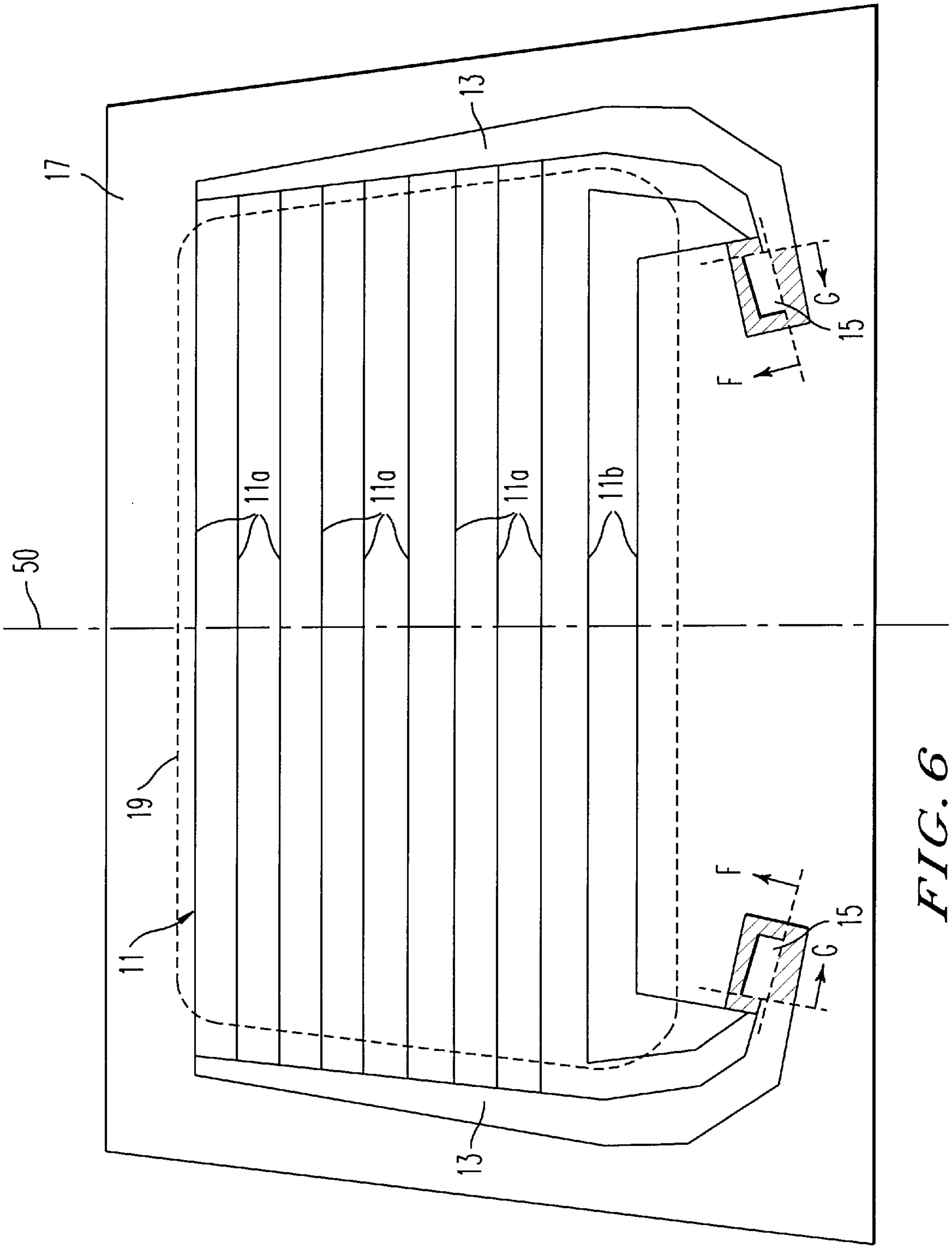
FIG. 6 is a view illustrating an anti-fogging glass provided with a fifth pattern according to the fifth embodiment.
Figure 7:
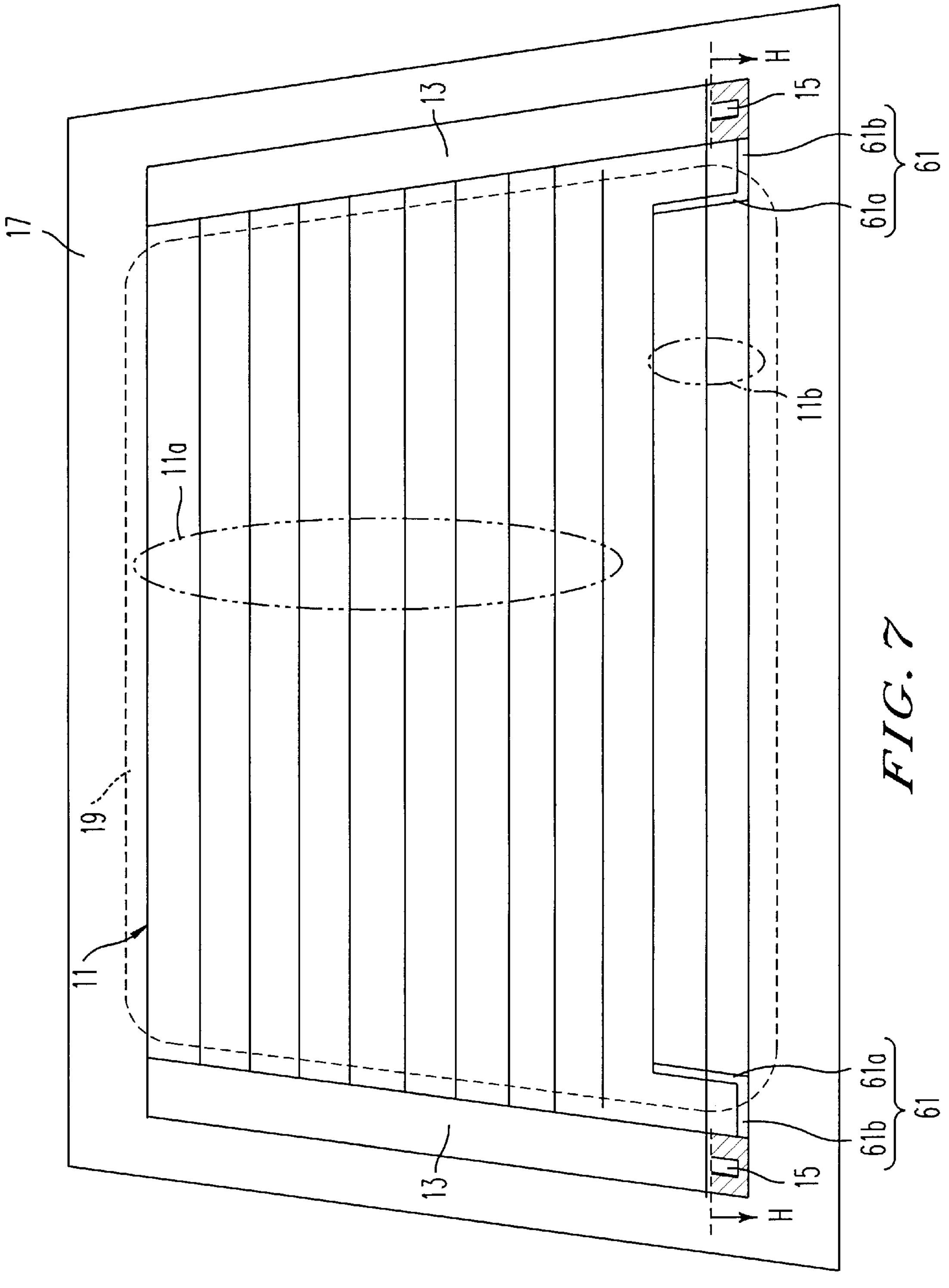
FIG. 7 is a view illustrating a reference example of an anti-fogging glass provided with a pattern wherein a plurality of heating lines are bundled into one line.

FIG. 6 is a view illustrating an anti-fogging glass having a fifth pattern formed as the fifth embodiment of the present invention. In FIG. 6, the same parts as in the first embodiment (FIG. 1) are identified with the same symbols, and reference numeral 11 represents heating lines, 11_a_ first heating lines, 11_b_ second heating lines, 13 bus bars, 15 terminal portions, 17 a glass plate, and 19 an anti-fogging region.

As compared with the fourth pattern, the fifth pattern differs in the number of second heating lines 11_b_. Further, as shown in FIG. 6, the bus bars 13 have lower ends having roughly of a U-shape of the fourth pattern slightly modified. Further, eleven heating lines 11 are provided, and they are connected to the bus bars not to cross one another. However, among these eleven lines, nine lines on the upper side of the glass plate are substantially linear first heating lines 11_a_ extending substantially in a horizontal direction without bend, and they are connected to the bus bars 13. On the other hand, two lines on the lower side of the glass plate are second heating lines 11_b_ having center portions extending substantially in a horizontal direction and side line portions on both sides of the center portions, wherein said side line portions are bent downward from the respective center portions, and the forward ends thereof are connected to the bus bars 13 in the vicinities of the terminal portions 15. In this embodiment, the vicinity of the terminal portion 15 which is in a second region in which the second heating lines 11_b_ are connected, is region 1) as shown by the region F in FIG. 6, a region at the end of the bus bar 13 (i.e. the portion on the upper side of the lower side line of the terminal portion 15) when each bus bar 13 is divided into two regions along the side of the rectangular terminal portion 15 opposite to the side at the end of the bus bar 13 with respect to the rectangular terminal portion 15 to which the second heating lines 11_b_ are connectable in a direction substantially perpendicular to each side of the terminal portion 15, or 2) as shown by region G in FIG. 6, a region on the center side of the anti-fogging glass (i.e. the portion on the lefthand side of the right side of the terminal portion 15 in the case where the second heating lines 11_b_ are connected to the righthand side bus bar, and the portion on the righthand side of the left side of the terminal portion 15 in the case where the second heating lines 11_b_ are connected to the lefthand side bus bar) when the bus bar 13 is divided into two regions along the side of the terminal portion 15 on the peripheral side of the anti-fogging glass among the two sides other than the side at the end of the bus bar 13 and the side opposite thereto (here, the peripheral side means the side opposite to the center (the center line 50 of the glass plate) side of the glass plate and corresponds to the side edge side of the glass plate in FIG. 6). Namely, the vicinity of the terminal portion 15 corresponds to the region hatched in the FIG. 6. The first region is the region of the bus bar 13, which is not hatched.

Further, the anti-fogging region 19 by the heating lines 11 of the anti-fogging glass is a trapezoid having an upper side of about 760 mm, a lower side of about 1,000 mm and a vertical length of about 363 mm. The heating lines 11 are lines with a width of from about 0.5 to 1.0 mm, and a distance of the respective heating lines from one another is about 33 mm. The bus bars 13 are of a curved shape (a modified shape of the U-shape of the fourth pattern) with a width of from about 3 to 18 mm and a length of about 470 mm and have a widened portion added to have an adequate area to locate the terminal portion 15 at the end of the bus bar on the curved side positioned at the lower portion of the glass plate. The bus bars 13 are symmetrically disposed relative to the center line 50 of the glass plate so that the bus bar ends on the curved side are directed to the center side of the glass plate. Each terminal portion 15 is roughly of a rectangular shape having a vertical length of about 21 mm and a transverse length of about 7 mm, and it is located at a position of about 10 mm from the lower end of the bus bar 13.

The distance between the adjacent contact points of the respective heating lines 11 with the bus bar 13 is about 50 mm between the first and second lines on the upper side of the glass plate, about 40 mm between the second and third lines, about 37 mm between the third and fourth lines, about 35 mm between the fourth and fifth lines, about 33 mm from the fifth to ninth lines, respectively, about 130 mm between the ninth and tenth lines and about 15 mm between the tenth and eleventh lines.

As described in the foregoing, anti-fogging glasses of the first to fifth embodiments are anti-fogging glasses having a plurality of conductive heating lines disposed with a predetermined distance from one another and extending substantially in a horizontal direction at least at their center portions, a pair of bus bars to which both ends of the respective heating lines are connected, and terminal portions located in the vicinities of the lower ends of the respective bus bars, to which terminals for supplying a current are to be connected, wherein among the plurality of heating lines, lower heating lines corresponding to from 10 to 50%, have center portions extending substantially in a horizontal direction and side line portions on both sides of the center portions, wherein said side line portions are bent downwardly from the respective center portions, and the forward ends thereof on the bus bar side, are connected apart from one another to the bus bars in the vicinities of the terminal portions.

Namely, in the anti-fogging glasses of the first to fifth embodiments, among the plurality of heating lines 11, the second heating lines 11*b* corresponding to from 10 to 50%, are connected to the bus bars in the predetermined region (the second region) in the vicinities of the terminal portions 15 other than a region (the first region) constituting a current pathway to the first heating lines 11*a*. By this construction, even when a current of the same level as heretofore is supplied, not all the current to be supplied to the heating lines 11 will flow to the bus bars. According to the present invention, excessive heat generation of the bus bars can be suppressed simply by changing the positions for connecting the heating lines to the bus bars (i.e. changing the shape of the pattern) without reducing the resistance of the bus bars by broadening the transverse width of the bus bars or by overcoating or by a special printing method such as thick printing. Further, since overcoating or a special printing such as thick printing, or broadening of the transverse width of the bus bars, is not required, it is possible to simplify the production process, reduce the production cost and the material cost for the production and improve the yield of the product. Further, it is possible to prevent breakage of the glass plate due to local heat generation.

Further, by adjusting the distance between the adjacent contact points of the heating lines with the bus bars to be adequate, it is possible to suppress excessive heat generation of the bus bars and heating lines in the vicinity of the contact points, due to the mutual heat generation of the heating lines.

Especially, with the anti-fogging glasses of the first to fifth embodiments, a special printing such as thick printing or broadening of the transverse width is not required at all to suppress the heat generation, and the appearance is good. Especially when these heating lines are screen-printed on a thin glass plate, it is possible to avoid breakage of the glass plate during the production, whereby an improvement in yield can be accomplished.

According to the present invention, it is possible to present an anti-fogging glass suitable for automobiles (especially a rear window glass for hatchback type automobiles), which is free from excessive heat generation at the bus bars, even when a current of the same level as heretofore is supplied to the bus bars having no special printing applied, while simplifying the production process, reducing the production cost and improving the yield of the product.

In addition a special printing such as thick printing or broadening of the transverse width is not required at all to suppress the heat generation, and the appearance is good. Especially when these heating lines are screen-printed on a thin glass plate, it is possible to avoid breakage of the glass plate during the production.

What is claimed is:

1. An anti-fogging glass having a plurality of conductive heating lines, a pair of bus bars to which both ends of the respective heating lines are connected, and terminal portions on the respective bus bars, to which terminals for supplying a current are to be connected, wherein the plurality of heating lines comprise first heating lines and second heating lines in a predetermined proportion to the plurality of heating lines, the second heating lines are connected in the vicinity of at least one terminal portion, and said vicinity of the terminal portion, in which the second heating lines are connected, is a second region other than a first region comprising a current pathway to the first heating lines, and wherein the second heating lines are connected apart from one another in the second region.

2. The anti-fogging glass according to claim 1, wherein the second heating lines are connected to the bus bars in the vicinity of one terminal portion and in the vicinity of the other terminal portion, and the respective vicinities of the terminal portions, in which the second heating lines are connected, are a second region other than a first region constituting a current pathway to the first heating lines.

3. The anti-fogging glass according to claim 1, wherein the predetermined proportion is from 10 to 50%.

4. The anti-fogging glass according to claim 1, wherein the contact points of the plurality of second heating lines with the bus bars are, respectively, apart from one another by at least 5 mm.

5. The anti-fogging glass according to claim 1, wherein the terminal portions are located at the upper or lower ends of the bus bars.

6. The anti-fogging glass according to claim 5, wherein each bus bar is of a strip shape, each terminal portion is of a rectangular shape and is located at the upper or lower end of the bus bar, and when each bus bar is divided into two regions along the side of the rectangular terminal portion opposite to the side at the end of the bus bar, the second region is the region at the end of the bus bar.

7. The anti-fogging glass according to claim 5, wherein each bus bar is of a strip shape with its one end being of a L-shape, said one end has an adequate area to have the terminal portion located therein, and each terminal portion is of a rectangular shape and is located at said one end being of a L-shape, and when each bus bar is divided into two regions along the side of the rectangular terminal portion opposite to the side at the end of the bus bar, the second region is the region at the end of the bus bar.

8. The anti-fogging glass according to claim 5, wherein each bus bar is of a strip shape with its one end being of a U-shape, said one end has an adequate area to have the terminal portion located therein, each terminal portion is of a rectangular shape and is located at said one end being of a U-shape, an extension of the inside line of the turn-around portion of the bus bar does not cross the terminal portion, and when each bus bar is divided into two regions along the side of the rectangular terminal portion opposite to the side at the end of the bus bar, the second region is the region at the end of the bus bar.

9. The anti-fogging glass according to claim 5, wherein each bus bar is of a strip shape with its one end being of a U-shape, each terminal portion is of a rectangular shape and is located at said one end being of a U-shape, an extension of the inside line of the turn-around portion of the bus bar crosses the terminal portion, and with respect to the rectangular terminal portion to which the second heating lines are connectable in a direction substantially perpendicular to each side of the terminal portion, when each bus bar is divided into two regions along the side of the rectangular terminal portion opposite to the side at the end of the bus bar, the second region is the region at the end of the bus bar, or when the bus bar is divided into two regions along the side of the terminal portion on the peripheral side of the anti-fogging glass among the two sides other than the side at the end of the bus bar and the side opposite thereto, the second region is the region on the center side of the anti-fogging glass.

10. An anti-fogging glass having a plurality of conductive heating lines disposed with a predetermined distance from one another and extending substantially in a horizontal direction at least at center portions thereof, a pair of bus bars to which both ends of the respective heating lines are connected, and terminal portions located in the vicinities of the lower ends of the respective bus bars, to which terminals for supplying a current are to be connected, wherein among the plurality of heating lines, lower heating lines corresponding to from 10 to 50%, have center portions extending substantially in a horizontal direction and side line portions on both sides of the center portions, wherein said side line portions are bent downward from the respective center portions, and the forward ends thereof on the bus bar side, are connected apart from one another to the bus bars in the vicinities of the terminal portions.

* * * * *